7924X
I. Eaton,
Bedstead Fastening,
Patented Dec. 31, 1833.
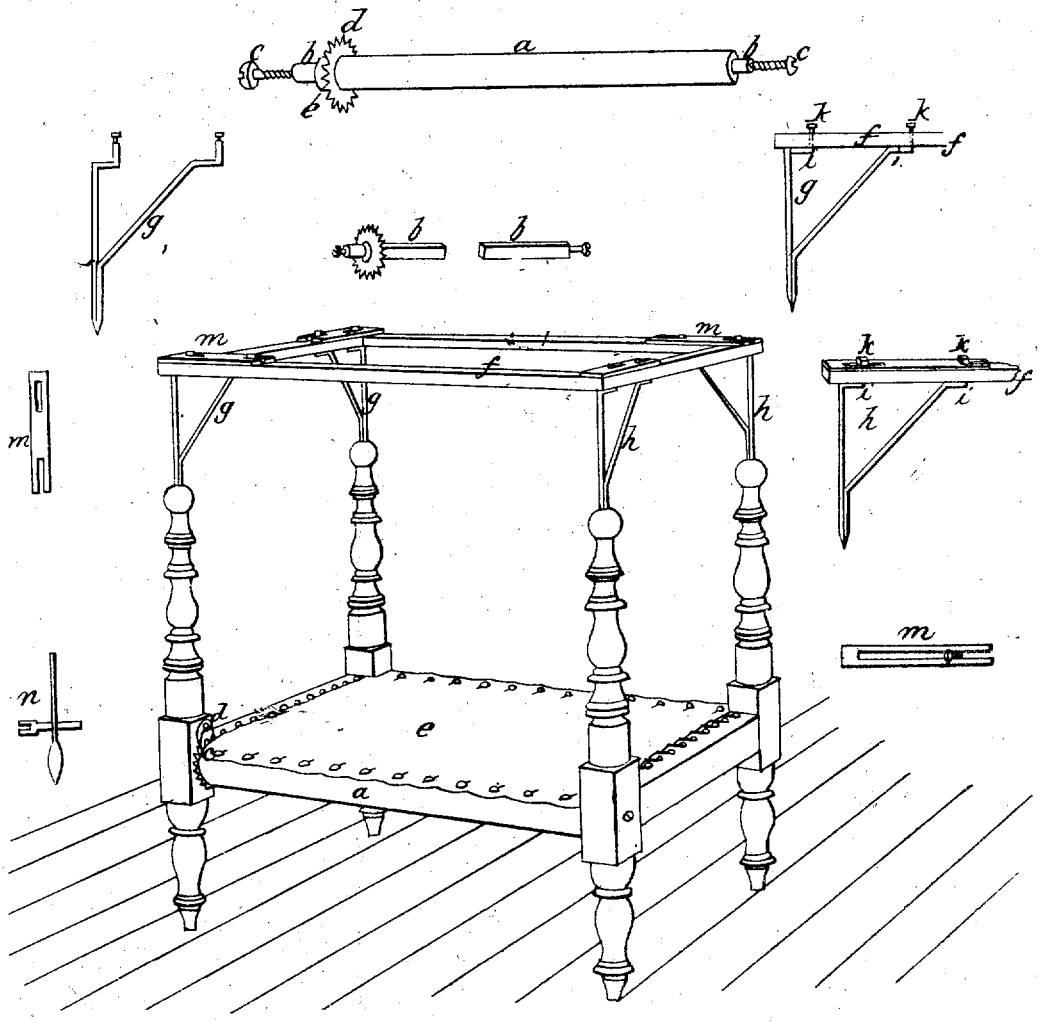

7924X

Dec. 31, 1833

Isaac Eaton, of Mount Gilead, Va.
Letters Patent.

The schedule referred to in these Letters Patent making part of the same containing a
description in the words of the said Isaac Eaton himself of his improvement in the con-
struction of Bedsteads -

Be it known that I Isaac Eaton of Mount Gilead, in the County of Lou-
doun & State of Virginia have invented a new & useful improvement in the construction
of bedsteads by which the sacking bottom or cords may be strained and curtains erected
upon low post bedsteads with facility & strength, & that the following is a full & exact descrip-
tion of the construction & operation of the said improvement as invented by me reference
being had to the annexed drawings — —
These bedsteads are made in the ordinary manner of the common low post bedstead,
with the exception that one of the rails marked a. is constructed on the rotary principle,
is round or many sides with a strong metallic or wood gudgeon b. inserted into each
end of this rail penetrating longitudinally about six inches - The part of the gudgeon inser-
ted in the rail should be made square, & from half an inch to an inch thick —
The other or projecting part should be perfectly round & of nearly the same diameter with the
square end, its diameter to be reduced at the outward end an inch in length on which a
male screw should be cut & a round tap nicely adjusted on the outside of which tap there
should be cut a deep depression in the usual manner to receive the end of the screw driver,
hereafter to be described, for the purpose of taking off this tap at pleasure —
The whole length of this round projecting part of the gudgeon should be adapted to the
thickness of the posts or upright pieces of the bedstead into which it is to be let in a round
opening which is to be made thro the post with a cavity or depression of greater diameter
on the outside to admit the tap - If the posts at the joining of the rails should be five
inches square, then the length of the round part of the gudgeon should be four inches & three
fourths long - The gudgeons or round tenons may be cut on the end of the revolving rail
with a male screw cut at the end thereof with a tap to secure it, or it may be made to
turn in the post secured by a common male screw inserted into a female screw in the end
of the Tenon - A rag wheel c. of five or six inches in diameter is fitted on one end of the
round rail in such a manner as to embrace the square part of the gudgeon which in
this end of the rail is allowed to project an eighth of an inch from the wood for that purpose;

7924X the circumference of which wheel is cut into notches or teeth like all rag wheels so that with a pall, catch or trigger d. with one end dropped into one of these notches, & the other end fas- tened to the bed post by a strong screw or round pin, passing thro' a round hole in this end of the pall, into the post. & the whole so arranged that the rail is allowed to revolve from above outwards, & that its motion cannot be reversed without raising the loose end of the pall out of the notch of the rag wheel. Between the rag wheel & the post is a washer or ring made to fit the round part of the gudgeon, which may be embedded a little into the wood of the post but projecting from it so far as to prevent the rag wheel from rubbing the post, & to let the trig- ger have more room to play on the wheel. This revolving rail may also be banded to prevent it from splitting if necessary. The sacking bottom c. is attached to the side rails or to the revolving rail, & to the one opposite to it by eye-let holes which button on knobs in the side rails as in the common bedstead: & is attached to the two end rails by means of a rope which passes thro' the hem of the sacking on each side (to strengthen the holes) its ends passing thro' loops sewed on the ends of the sacking & over knobs in the end rails: the end of which being tied to- gether on each side, so that when the revolving rail is turned by a lever the end ropes are stretched at the same time that the canvass is strained from side to side which will tighten in every direction — The curtain frame f. is sustained by four braces g.g. & h.h. made of strong wire one end of which is inserted into a small hole in the top of each post, the other divides in such a manner that one branch or brace reaches to the corner of the curtain frame whilst the other extends the distance of a foot from the corner —

These upper ends of the braces must have shoulders i. with bolts k. extending therefrom in which the frame rests secured by screw taps l. or by broad heads on the bolts with with slides, m. slip- ped on them so as to embrace the bolts under the heads in the manner represented in the draw- ings — This bedstead can be taken down by a screw driver & lever such as is represented in the drawings at the letter n. —

What I claim as my invention & wish to secure by Letters patent is the before described im- provement in the construction of bedsteads, by which the sacking bottom can be strained with a single revolving rail & the curtain frame sustained by the iron braces —

In testimony whereof I have hereunto subscribed my name before two witnesses at the City of Washington this 17th day of December 1833 —

Witnesses
Wm. P. Elliot
Robt. Clarke (Drw. in portfolio)

Isaac Eaton

Ind. M.C.

[1140 [illegible]]